US005167870A

United States Patent [19]

Boyd et al.

[11] Patent Number: 5,167,870

[45] Date of Patent: Dec. 1, 1992

[54] STRUCTURES EXHIBITING IMPROVED TRANSMISSION OF ULTRAHIGH FREQUENCY ELECTROMAGNETIC RADIATION AND STRUCTURAL MATERIALS WHICH ALLOW THEIR CONSTRUCTION

[75] Inventors: Jack D. Boyd, Westminster; Hermann Sitt, Brea; Hong-Son Ryang, Camarillo; Theodore F. Biermann, Mission Viejo, all of Calif.

[73] Assignee: BASF Aktiengesellschaft, Ludwigshafen, Fed. Rep. of Germany

[21] Appl. No.: 555,287

[22] Filed: Jul. 19, 1990

Related U.S. Application Data

[62] Division of Ser. No. 238,021, Aug. 29, 1988, Pat. No. 4,956,393.

[51] Int. Cl.[5] .................... C08F 283/00; C08G 18/70

[52] U.S. Cl. .................................. 525/540; 523/137; 523/444; 523/461; 525/185; 525/455; 524/494

[58] Field of Search ...................... 523/137, 444, 461; 525/185, 455, 540; 524/494

[56] References Cited

U.S. PATENT DOCUMENTS

| | | | |
|---|---|---|---|
| 4,396,745 | 8/1983 | Ikeguchi | 525/374 |
| 4,645,805 | 2/1987 | Gaku et al. | 525/437 |
| 4,740,584 | 4/1988 | Shimp | 528/422 |
| 4,785,075 | 11/1988 | Shimp | 528/422 |
| 4,904,760 | 2/1990 | Gaku et al. | 528/422 |

*Primary Examiner*—Paul R. Michl
*Assistant Examiner*—U. K. Rajguru
*Attorney, Agent, or Firm*—William G. Conger

[57] ABSTRACT

Radomes having increased transparency and reduced reflectivity and refractivity to radar waves may be prepared or repaired utilizing heat-curable resin-containing structural materials in which the heat-curable resin contains greater than about 70 weight percent of cyanate functional monomers. The structural materials take the form of matrix resin impregnated prepegs and composites, film adhesives, paste adhesives, syntactic foams, and expandable foams, and may be used to prepare numerous useful structural features including honeycomb materials and leading edge radomes containing syntactic foams.

4 Claims, No Drawings

STRUCTURES EXHIBITING IMPROVED TRANSMISSION OF ULTRAHIGH FREQUENCY ELECTROMAGNETIC RADIATION AND STRUCTURAL MATERIALS WHICH ALLOW THEIR CONSTRUCTION

This is a division of application Ser. No. 07/238,021 filed Aug. 29, 1985, now U.S. Pat. No. 4,956,393.

BACKGROUND OF THE INVENTION

1. Field of the Invention

The subject invention related to structures exhibiting improved transmission of electromagnetic radiation in the radar wave region of the spectrum, and to structural material which allow the construction of such structures.

2. Description of Related Art

Innumerable technological improvement in the amplification, signal conditioning and treatment, radiation and reception of electromagnetic radiation in the radar wave portion of the spectrum have been made since the inception of the use of radar in the 1930's, and extension of the range of operable frequencies has been made well into the Ghz region. However, because most radar antennae are enclosed, transmission of radar waves in the vicinity of the antenna is still problematic.

The enclosure surrounding a radar antenna, regardless of its actual shape, is termed a radome. Radomes are strong, electrically transparent shells which provide protection of the antenna from meteorological events, especially wind and water. In the case of military radar, protection form concussive effects of nearby guns or the blast from near hits is also required. Some protection from ballistic energy is also required.

Radomes vary in size and shape from simple conical or parabolic housings whose diameters are measured in centimeters, to large dome shaped structures tens of meters in diameter. The construction methods and structural material utilized in building radomes are equally varied.

Ideally, the principle radome material should have the same transmission properties as air. However, this ideal cannot be achieved, and considerable losses in signal strength and changes in the wave envelope occur because of the electrical characteristics of the structural materials.

Due to large differences between the dielectric constants of the structural materials and air, reflections occur at the air/material interfaces, causing signal loss as well as complicating signal processing. In addition, due to the differences in geometric shape of the antenna and its radome, the various signal paths are generally not equal and thus refractance of the signal also occurs. Finally, the construction materials exhibit a power loss through absorption of the signal. This absorption, quantified by the loss tangent, is roughly analogous to the phenomenon of electrical resistance in the transmission of current electricity, causes heating of the radome material, and is the basis for dielectric heating so commonly used in industry.

When radomes are constructed from fiber reinforced composites, epoxy resins and bismaleimide matrix resins are generally used due to their excellent physical characteristics. Unfortunately, the electrical characteristics of these materials are far from ideal. The fiber reinforcement in such applications generally consist of fibers spun from fused quartz, as these fibers have dielectric constants and loss tangents far better than ordinary glass fibers formed from borosilicate glasses.

When radomes are constructed from honeycomb material, especially common for large radomes, the outer, face-plies are generally a thin fiber reinforce composite prepared form epoxy or bismaleimide impregnated heat-curable prepregs, while the honeycomb itself may be prepared from similar prepregs, from phenolic resin impregnated prepregs, or from extruded thermoplastics such as high temperature service polycarbonates or polyimides. In this case, as with traditional fiber-reinforced composites, the resin systems utilized for forming the face plies and the honeycomb often do not have the desired electrical characteristics. Moreover, the face sheets are adhesively joined to the honeycomb core through the use of film adhesives. In the past epoxy, bismaleimide, and phenolic film adhesives have been used, and thus the film adhesives suffer from the same electrical drawbacks as the matrix resins used in the face plies. Moreover, many of these adhesives have less than the desired ability to bond to certain prepregging materials, particularly those prepared using bismaleimide matrix resins.

Ceramic material have been utilized for small radomes, particularly for missle applications. However it is well known that ceramic material tend to be brittle and difficult to fabricate. When adhesives are utilized to bond ceramic constructs to themselves, to other parts of the radome structure, or to the missle or other base, once again epoxy and other common adhesives have been used, adhesives which have higher dielectric constants and greater loss than the ceramic materials they join.

Sinterd polytetrafluoroethylene (PTFE) powders and fibers have been used in radomes due to their excellent electrical properties, as disclosed in U.S. Pat. Nos. 4,364,884 and 4,615,859. However, such structures are difficult to fabricate and lack the strength required for many military applications. PTFE fibers could be used in conjunction with epoxy or bismaleimide matrix resins, but would then suffer form the electrical disadvantages of these resins.

In U.S. Pat. No. 4,436,569, a protective cover for use with radomes or other aircraft structures is proposed in which a polyethylene/polyurethane composite is adhesively bonded to the underlying structure, preferably with a polyurethane adhesive. Unfortunately, the polyurethane polymer and adhesive have relatively low strength properties at elevated temperatures, as does also the polyethylene.

Bismaleimide-triazine resins have been proposed for use in electrical circuit boards by the Mitsubishi Gas Chemical Company, Inc., in their brochure entitled "BT Resin". These resins contain difunctional monomers having a bismaleimide group as one of the functional groups, and a cyanate group as the other. However the reported dielectric constant is reported to be high, being greater than 4.2 and 1 Mhz. Thus these resins would not appear to have the low dielectric constant desired of a prepregging resin or adhesive based on this publication, and moreover, their electrical behavior in the radar region (>100 Mhz), is unknown.

In U.S. Pat. No. 4,353,769, a composite material for radomes is proposed in which Astroquartz ® fiber reinforcing fabric is impregnated with a specific prepolymer made from ethyleneglycol, 4,4'-methylenediphenylenediisocyanate, and 2,4- toluenediisocyanate. However the dielectric constants of these material are still higher than desirable, and loss tangents are truly improved over only a narrow compositional range. Moreover, the cured prepreg lacks adequate high temperature performance due to the use of polyurethane as the matrix resin.

The use of high temperature polimides has been proposed for fiber reinforced radomes in supersonic applications. See, for example, M. C. Cray, "High Performance Radome Manufacture Using Polyimides, " Vol. 1, p. 309–319, *Proceedings, International Conference on Electromagnetic Windows, 3d.* (1976), and T. Cook, "Supersonic Radomes in Composite Materials," Vol. 1, p. 4-1 to 4-14, *Proceedings of the Third Technology Conference* (1983). However thermosetting polyimides are difficult to process, especially with regard to the formation of volatiles during cure, and thermoplastic polyimides require high temperature extrusion or pressure forming, which again renders their use problematic. Furthermore, it is difficult to formulate suitable adhesives from polyimides, particularly when the adherends are composites prepared from bismaleimide resin impregnated prepregs.

E-glass reinforced PTFE and S-glass reinforced perfluoroepoxy resins have been proposed as candidates for radome applications by E. A. Welsh, "Evaluation of Ablative Materials for High Performance Radome Applications," *Symposium on Electromagnetic Windows, 15th*, p. 179–185, (1980). Reinforced PTFE is expensive and difficult to process, however; and.perfluoroepoxy resins are both difficult to prepare as well as not being readily available.

The use of a variety of thermoplastics including polyimides, polyamide-imides, polyphenylene sulfides, nylons, polyesters, and polyethersulfones, among them, has been proposed by R. A. Mayor in "Cost Effective High Performance Plastics for Millimeter Wave Radome Applications," *Proceedings, Twenty-Fourth National SAMPE Symposium*, Book 2, p. 1567–1591 (1979). However many of these materials, such as melt processable nylons and polyesters do not have the high temperature capabilities desired, and the high performance thermoplastics such as the polyimides and polyethersulfones are difficult to process. In addition, many of these thermoplastics have undesirably high dielectric constants and loss tangents.

In U.S. Pat. No. 4,568,603 is disclosed a fiber reinforced syntactic foam useful for lightweight structures such as microwave waveguides. However, as can be surmised from their intended use, these materials are microwave reflective rather than transparent. The use of epoxy resins in formulating such syntactic foams and the inclusion of graphitic or carbon fibers is in agreement with this conclusion. Thus the use of such syntactic foams as adhesives, fillers, or as structural materials in radar applications requiring transparency, is prohibited.

Thus there exists a need for structural materials, particularly structural adhesives, which have low dielectric constants and low loss tangents in the radar region of the spectrum, and which also have superior strength, toughness, and adhesive qualities. Thus far such products have not been available to the industry.

SUMMARY OF THE INVENTION

An objective of this invention is to provide radomes having increased transparency to radar waves. A further object is to provide structural materials which are suitable for the construction of such radomes. These structural materials include heat-curable fiber reinforced prepregs, film adhesives, paste adhesives, and syntactic foams wherein the principle heat curable monomer is a di-or polycyanate resin. These materials have unexpectedly low dielectric constants and loss tangents at radar and microwave frequencies, and, in addition, possess exceptional physical properties at high temperatures.

DESCRIPTION OF THE PREFERRED EMBODIMENTS

The radomes of the subject invention are varied in both size, shape, and construction. In the case of radar in the X, K, and Q bands, the size may be a matter of a few centimeters or tens of centimeters only, while in the P and K bands, the size may be as large as tens of meters. The construction of such radomes is will known to those skilled in the art. In addition to the articles previously cited, construction and design details of such radomes may be found in the following references; G. Tricoles, "Wave Propagation Through Hollow Dielectric Shells", NTIS HC AO5/MF AO1 (1978); H. Bertram, "The Development Phase, Design Manufacture, and Quality Control of the MRCA-radome", vol. 1, p. 329–349, *Proceedings, International Conference or Electromagnetic Windows, 3d.*, (1976); C. A. Paez, "Radome Design/Fabrication Criteria for Supersonic EW Aircraft", p. 166–186, *Proceedings, Tenth National SAMPE Technical Conference*, (1978); K. B. Armstrong, "British Airways Experience with Composite Repairs", *The Repair of Aircraft Structures Involving Composite Materials*, NTIS HC A11/MF AO1 (1986); J. B. Styron, "A Broadband Kevlar Radome for Shipboard", Part 2, p. 135–144, *Proceedings, Symp. on Electromagnetic Windows (17th)*, (1984); Chuang, C. A. "Miniaturization Techniques Benefit Conformal Arrays", *Microwaves and RF*, vol. 23, March 1984, p. 87–92; L. M. Poveromo, "Polyimide Composites-Grumman Application Case Histories, "*Proceedings, 27th, National Sampe Symposium*, (1982); H. Feldman, "Design of Variable Thickness Sandwich Radomes", p. 40–43, *Proceedings, Symposium or Electromagnetic Windows, 15th*, (1980); D. Purinton, "Broadband High Speed Reinforced Plastic Radome", p. 1–5, *Symposium on Windows, 14th*, (1978); R. Chesnut, "LAMPS Radome Design", p. 21–23, *Symposium on Electromagnetic Windows, 13th* (1976); J. Peck, "Development of a Lower Cost Radome", Society of Automotive Engineers, SAE Paper 730310 (1973). Of course, these are but a sampling of the many articles which deal with radome construction.

The radomes of the subject invention exhibit high transparency of electromagnetic radiation in the radar region of the spectrum by virtue of the use of matrix resins, film adhesives, syntactic foams, cellular adhesives, core splice adhesives, and paste adhesives which are heat-curable resin system containing a majority of a cyanate-functional resin. This cyanate functional resin may be a di-or polyfunctional cyanate monomer of relatively low molecular weight, a di- or polyfunctional cyanate oligomer, or a relatively higher moleuclar weight cyanate-functional prepolymer.

Thus one aspect of the subject invention concerns the use of one or more of the previously identified types of cyanate resin systems in the production of radomes; while a second, closely related aspect, are the radomes thusly produced, A further aspect of the subject invention relates to compositions of matter which may be utilized to prepare syntactic foams, cellular foams, and heat-curable adhesives and which exhibit superior transparency to electromagnetic radiation in the microwave and radar regions of the spectrum. Finally, a still further aspect of the subject invention relates to a novel process of the preparation of compositions suitable for cyanate-functional adhesives and prepregging resin.

By the term heat-curable resin system is meant a composition containing reactive monomers, oligomers, and/or prepolymers which will cure at a suitably elevated temperature to an infusible solid, and which composition contains not only the aforementioned monomers, oligomers, etc., but also such necessary and optional ingredients such as catalysts, co-monomers, reheology control agents, wetting agents, tackifiers, tougheners, plasticizers, fillers, dyes and pigments, and the like, but devoid of microspheres or other "syntactic" fillers, continuous fiber reinforcement, whether wove, non-woven (radome), or unidirectional, and likewise devoid of any carrier scrim material, whatever its nature. The heat-curable resin systems of the subject invention contain greater than about 70 weight percent of cyanate-functional monomers, oligomers, and/or prepolymers, not more than about 25 precent by weight of a bismaleimide comonomer, and optionally up to about 10 percent of an epoxy resin.

By the term "film adhesive" is means a heat-curable film, which may be unsupported or supported by an optional carrier, or scrim. Such films are generally strippably adhered to a release film which may be a polyolefin film, a polyester film, or paper treated with a suitable release coating, for example a silicon coating. Such film adhesives are useful in joining metal and fiber reinforced composite adherends as well as adherends of other materials, such as wood, plastic, and ceramics. Certain film adhesives, for example those of the subject invention, may also be used as prepegging matrix resins.

By the term "paste adhesive" is meant a heat-curable adhesive which is semisolid or at least highly viscous or thixotropic in nature, in order that is may be spread upon the adherends with suitable tools, for example brushes, spatulas, trowels, and will remain upon the surface until the parts are cured. Such adhesives generally contain a greater proportion of fillers and thickeners than other adhesives, but of course do not contain a carrier web. Curing of the paste adhesives of the subject invention past adhesives is achieved at 177° C.

By the term "syntactic foam" is means a heat-curable resin system which contains an appreciable volume percent of preformed hollow beads or "microspheres". such foams are of relatively low density, and generally contain from 10 to about 60 weight percent of microspheres, and have a density, upon cure, of from about 0.50 $g/cm^3$ to about 1.1 $g/cm^3$ and preferably have loss tangents at 10 Ghz as measured by ASTM D 2520 of 0.008 or less. The microspheres may consist of glass, fused silica, or organic polymer, and range in diameter form 5 to about 200 $\mu m$, preferably about 150 $\mu m$, and have densities of from about 0.1 $g/cm^3$ to about 0.4 $g/cm^3$ to about 0.4 $g/cm^3$. The syntatic foams are cured at 177° C.

By the term "foam adhesive" or "expandable adhesive" is means a heat-curable adhesive containing a blowing agent such that the cured adhesive contains numerous open or closed cells whose walls consist of the cured adhesive itself. Hybrid adhesives containing both microspheres (as in syntactic foams) and adhesive-walled cells are also contemplated. The blowing agent may be a liquid of suitable volatility or an organic or inorganic compound which decomposes into at lest on gaseous component at elevated temperature, for example, p,p-oxybisbenzenesulfonyl hydrazide. Many other such blowing agents are known to those skilled in the art.

By the term "matrix resin" is means a heat-curable resin system which comprises the major part of the continuous phase of the impregnating resin of a continuous fiber-reinforced prepreg or composite. Such impregnating resins may also contain other reinforcing media, such as whiskers, microfibers, short chopped fibers, or microspheres. Such matrix resins are used to impregnate the primary fiber reinforcement at levels of between 10 and 70 weight percent, generally from 30 to 40 weight percent. Both solution and/or melt impregnation techniques may be used to prepare fiber reinforced prepregs containing such matrix resins. The matrix resins may also be used with chopped fibers as the major fiber reinforcement, for example, where pultrusion techniques are involved.

In the manufacture of radomes having improved transparency to waves int he radar region of the spectrum, i.e. frequencies of from about 100 Mhz to about 100 Ghz, conventional methods of design and/or construction are used, except that the cyanate resin systems of the subject invention will replace the traditional epoxy, bismaleimide, phenolic or other heat-curable resins in one or more, and preferably all, of their respective areas of application.

In other words, it is preferable when utilizing honeycomb materials having fiber reinforced epoxy or bismaleimide resin face plies, the analogous face plies containing a cyanate functional resin will be utilized instead, and that cyanate adhesive will be used to bond the face plies to the honeycomb rather than the conventional epoxy, bismaleimide, or phenolic resins. Even the honeycomb itself may be formed form cyanate impregnated Astroquartz ®, polyolefin, or PTFE fibers.

When preparing radomes using either chopped or conventional continuous fiber reinforced heat curable resins, the cyanate matrix resins of the subject invention may replace analogous epoxy and bismaleimide resins. When it is desired to use syntactic foams as adhesives, fillers or load bearing members, the cyanate functional syntactic foams of the subject invention may replace syntactic foams containing other heat curable resins. Of course, the low loss, low dielectric constant products of the invention may also be useful in electronic applications requiring such properties, particularly when cyanates such as bis[4-cyanato-3,5-dimethylphenyl] methane are used.

The various cyanate resin systems of the subject invention contain in excess of about 70 weight percent of cyanate functional monomers, oligomers, or prepolymers, about 25 weight percent or less of bismaleimide comonomer, and up to about 10 weight percent of epoxy comonomer, together with from 0.0001 to about 5.0 weight percent catalyst, and optionally, up to about 10 percent by weight of engineering thermoplastic. In addition to these components, individual formulations may require the addition of minor amounts of fillers, tackifiers, etc.

Cyanate resins are heat-curable resins whose reactive functionality is the cyanate, or —OCN group. These resins are generally prepared by reacting a di- or polyfunctional phenolic compound with a cyanogen halide, generally cyanogen chloride or cyanogen bromide. The method of synthesis by now is well known to those skilled in the are, and examples may be found in U.S. Pat. Nos. 3,448,079, 3,553,244, and 3,740,348. The products of this reaction are the di- and polycyanate esters of the phenols.

The cyanate ester prepolymers useful in the compositions of the subject invention maybe prepared by the heat treatment of cyanate functional monomers either with or without a catalyst. The degree of polymerization may be followed by measurement of the viscosity. When catalysts are used to assist the polymerization, tin catalysts, e.g. tin octoate, are preferred. Such prepolymers are known to the art.

Suitable cyanate reins may be prepared from mono-, di-, and polynuclear phenols, including those containing fused aromatic structure. The phenols may optionally be substituted with a wide variety of organic radicals including, but not limited to halogen, nitro, phenoxy, acyloxy, acyl, cyano, alkyl, aryl, alkaryl, cycloalkyl, and the like. Alkyl substituents may be halogenated, particularly perchlorinated and perfluorinated. Particularly preferred alkyl substituents are methyl and trifluoromethyl.

Particularly preferred phenols are the mononuclear diphenols such as hydroquinone and resorcinol; the various bisphenols such as bisphenol A, bisphenol F, bisphenol K, and bisphenol S; the various dihydroxynaphthalenes; and the oligomeric phenol and cresol derived novolacs. Substituted varieties of these phenols are also preferred. Other preferred phenols are the phenolated dicyclopentadiene oligomers prepared by the Friedel-Crafts addition of phenol or a substituted phenol to dicyclopentadiene as taught in U.S. Pat. No. 3,536,734.

Bismaleimide resins are heat-curable resins containing the maleimido group as the reactive functionality. The term bismaleimide as used herein includes mono-, bis-, tris-, tetrakis-, and higher functional maleimides and their mixture as well, unless otherwise noted. Bismaleimide resins with an average functionality of about two are preferred. Bismaleimide resins as thusly defined are prepared by the reaction of maleic anhydride or a substituted maleic anhydride such as methylmaleic anhydride, with an aromatic or aliphatic di- or polyamine. Examples of the synthesis may be found, for example, in U.S. Pat. Nos. 3,018,290, 3,018,292, 3,627,780, 3,770,691, and 3,839,358. The closely related nadic imide resins, prepared analogously from a di- or polyamine but wherein the maleic anhydride is substituted by a Diels-Alder reaction product of maleic anhydride or a substituted maleic anhydride with a diene such as cyclopentadiene, are also useful. As used herein and in the claims, the term bismaleimide resin shall include the nadic imide resins also.

Preferred di- and polyamine precursors include aliphatic and aromatic diamines. The aliphatic diamines may be straight chain, branched, or cyclic, and may contain heteroatoms. Many example of such aliphatic diamines may be found in the above cited references. Especially preferred aliphatic diamines are hexanediamine, octanediamine, decanediamine, dodecanediamine, and trimethylhexanediamine.

The aromatic diamines maybe mononuclear or polynuclear, and may contain fused ring systems as well. Preferred aromatic diamines are the phenylenediamines; the toluenediamines; the various methylenedianilines, particularly 4,4'-methylenedianiline; the naphthalenediamines; the various amino-terminated polyarylene oligomers corresponding to or analogous to the formula:

$$H_2N—AR[X—AR]_nNH_2$$

wherein each Ar may individually be a mono-or polynuclear arylene radical, each X may individually be $$—O—, —S—, —\overset{O}{\overset{\|}{C}}—, —\underset{O}{\underset{|}{\overset{O}{\overset{|}{S}}}}—, —O—\overset{O}{\overset{\|}{C}}—, —O—\overset{O}{\overset{\|}{C}}—O,$$

$C_1$–$C_{10}$ lower alkyl, and $C_2$–$C_{10}$ lower alkyleneoxy, or polyoxyalkylene; and wherein n is an integer of from about 1 to 10; and primary aminoalkyl terminated di- and polysiloxanes.

Particularly useful are bismaleimide "eutectic" resin mixtures containing several bismaleimides. Such mixtures generally have melting point which are considerably lower than the individual bismaleimides. Examples of such mixtures may be found in U.S. Pat. Nos. 4,413,107 and 4,377,657. Several such eutectic mixtures are commercially available.

Epoxy resins are thermosetting resins containing the oxirane, or epoxy group, as the reactive functionality. The oxirane group may be derived from a number of diverse methods of synthesis, for example by the reaction of an unsaturated compound with a peroxygen compound such as peracetic acid; or by the reactions of epichlorohydrin with a compound having an active hydrogen, followed by dehydrohalogenation. Methods of synthesis are well known to those skilled in the art, and may be found, for example, in the *Handbook of Epoxy Resins*, Lee and Neville, Ed.s., McGraw-Hill, © 1967, in chapters 1 and 2 and in the references cited therein.

The epoxy resins useful in the practice of the subject invention are substantially di- or polyfunctional resins. In general, the functionality should be from about 1.8 to about 8. Many such resins are available commercially. Particularly useful are the epoxy resins which are derived from epichlorohydrin. Example of such resins are the di- and polyglycidyl derivatives of the bisphenols, particularly bisphenol A, bisphenol F, bisphenol K and bisphenol S; the dihydroxynaphthalenes, for example 1,4-, 1,6-, 1,7-, 2,5-, and 2,7- dihydroxynaphthalenes; 9,9-bis[4-hydroxyphenyl]fluorene; the phenolated and cresolated monomers and oligomers of dicyclopentadiene as taught by U.S. Pat. No. 3,536,734; the aminophenols, particularly 4-aminophenol; various amines such as 4,4'-, 3,4'-, and 3,3'-methylenedianiline and analogs of methylenedianiline in which the methylene group is replaced with a $C_1$–$C_4$ substituted or unsubstituted lower alkyl, or —O—, —S—, —CO—, —O—CO—, —O—CO—O—, $—SO_2—$, or aryl group and both amino, hydroxy, and mixed amino and hydroxy terminated polyarylene oligomers having —O—, —S—, —CO—, —O—CO—O—, $—SO_2—$, and/or lower alkyl groups interspersed between mono or polynuclear aryl groups as taught in U.S. Pat. No. 4,175,175.

Also suitable are the epoxy resins based on the cresol and phenol novolacs. The novolacs are prepared by the condensation of phenol or cresol with formaldehyde, and typically have more than two hydroxyl groups per molecule. The glycidyl derivatives of the novolacs may be liquid, semisolid, or solid, and generally have epoxy functionalities of from 2.2 to about 8.

Also useful are epoxy functional polysiloxanes. These may be prepared by a number of methods, for example by the hexachloroplatinic acid catalyzed reaction of allylglycidyl either with dimethylchlorosilane followed by hydrolysis to the bis-substituted disiloxane. These materials may be equilibration polymerized to higher molecular weight bey reaction with a cyclic polysiloxane such as octamethylcyclotetrasiloxane. Preparation of the epoxy functional polysiloxanes is will known to those skilled in the are. Useful epoxy functional polysiloxanes have molecular weight from about 200 Daltons to about 50,000 Daltons, preferably to about 10,000 Daltons.

Suitable thermoplastic tougheners are high tensile strength, high glass transition polymers which fit within the class of compositions known as engineering thermoplastics. If more than 4–5 weight percent of such thermoplastics are used int he compositions of the subject invention, then their electrical properties become important. In this case, the thermoplastic, fully imidized polyimides, polyetherimides, polyesterimides, and polyamideimides are preferred. Such products are well known, and are readily commercially available. Examples are MATRIMID® 5218, a polyimide available from the Ciba-Geigy Co., TORLON®, a polyamideimide available from the Amoco Co., ULTEM®, a polyetherimide available from the General Electric Co., and KAPTON®, a polyetherimide available from the DuPont Company. Such polyimides generally have molecular weights above 10,000 Daltons, preferably above 30,000 Daltons.

Also suitable are the various soluble polyarylene polymers containing substituted and unsubstituted lower alkyl, —CO—, —CO—O—, —S—, —O—, —O—CO—O, and —$SO_2$— interspersed between the arylene groups, as taught in U.S. Pat. No. 4,175,175. Particularly preferred are the polyetheretherketones, polyetherketones, polyetherketoneketones, polyketonesulfones, polyethersulfones, polyetherethersulfones, and polyetherketonesulfones. Several of such polyarylene polymers are commercially available.

It is necessary that th thermoplastic be capable of dissolution into the remaining resin system components during their preparation. However, it is not necessary that this solubility be maintained during cure, so that the thermoplastic may phase out during cure. The order of mixing the thermoplastic containing prepregs of the subject invention is most important. Surprisingly, the mere mixing together of the ingredients does not afford a useful composition when cyanate prepolymers are used. In this case, solution of the polyimide may be obtained by first preparing a subassembly consisting of the polyimide dissolved in either the bismaleimide component, when the latter is used, or into cyanate functional monomer.

Suitable catalysts for the cyanate resin systems of the subject invention are well known to those skilled in the art, and include the various transition metal carboxylates and naphthenates, for example zinc, octoate, tin octoate, dibutyltindilaurate, cobalt naphthenate, and the like; tertiary amines such as benzyldimethylamine and N-methylmorpholine; imidazoles such as 2- methylimidazole; acetylacetonates such as iron(III) acetylacetonate; organic peroxides such as dicumylperoxide and benzoylperoxide; free radical generators such as azobisisobutyronitrile; organophoshines and organophosphonium salts such as hexyldiphenylphosphine, triphenylphosphine, trioctylphosphine, ethyltriphenylphosphonium iodide and ethyltriphenylphosphonium bromide; and metal complexes such as copper bis[8-hydroxyquinolate]. Combinations of these and other catalysts may also be sued.

Preferred reinforcing fibers, where such fibers are used, include fiberglass, polyolefin, and PTFE. Other types of fiber reinforcement may also be use, particularly those with low dielectric constants. When fiberglass is used, it is preferable that the fibers be greater than 90 weight percent pure silica. Most preferably, fused silica fibers are used. Such fibers are commercially available under the name ASTROQUARTZ®, a trademark of the J. P. Stevens Company.

Polyolefin fibers are also preferred. High strength polyolefin fibers area available from Allied-Signal Corporation under the tradename SPECTRA® polyethylene fiber. Such fibers have a dielectric constant of approximately 2.3 as compared to values form 4–7 for glass and about 3.75 for fused silica.

The examples which follow will serve to illustrate the practice of this invention, but are in no way intended to limit its application. The parts referred to in the examples which follow are by weight unless otherwise designated, and the temperatures are in degrees Celcius unless otherwise designated. In the claims, the term "adhesive" refers to adhesives of all types previously identified, i.e. film adhesives, syntactic foam adhesive, past adhesive, foam adhesives, and the like, unless more specifically identified.

EXAMPLE 1

A cyanate-functional structural adhesive was prepared by mixing 200 parts by weight of bis[4-cyanato-3,5-dimethylphenyl]methane and 60 parts of Compimide 353A, a eutectic mixture of bismaleimides believed to contain the bismaleimides of 4,4'-diaminodiphenylmethane, 2,4-toluenediamine, and 1,6-diaminotrimethyhexane, and which is available from the Boots-Technochemie Co. The mixture was heated and stirred at 130° C. for one hour, following which 20 parts by weight of an epoxy-terminated polysiloxane and 0.2 part by weight of copper bis[8-hydroxyquinolate] catalyst was added. Adhesive types were prepared by coating the mixture as a 15–20 mil film on both sides of glass fabric. Test specimens were cured for 4 hours at 177° C. and post cured for 2 hours at 232° C. Electrical properties of the neat resins are presented in Table I.

EXAMPLE 2(COMPARATIVE)

An attempt was made to prepare a thermoplastic toughened cyanate functional adhesive by dissolving MATRIMID® 5218, a fully imidized thermoplastic polyimide available from the Ciba-Geigy Corporation and based on 5(6)-amino-1-(4'-aminophenyl)-1,3-trimethylidane, into the prepolymer derived form bis[4-cyanato-3,5-dimethylphentyl]methane. However, solution could not be effected.

EXAMPLE 3

Into 17.0 parts by weight of bis[4-cyanato-3,5-dimethylphenyl]methane was slowly added 4.25 parts of Matrimid™ 5218. The mixture was heated to 150° C. to effect solution of the polyimide. Next, 19.7 parts of Compimide® 353A was heated to 150° C. in a mixing vessel, following which the previously prepared cyanate/polyimide was added. After complete solution is obtained, 53.0 parts of bis[4-cyanato-3,5-dimethylphenyl]methane prepolymer was added, mixed for 20 minutes, and cooled to 120° C., at which time 2.7 parts hydrophillic silica (CABOSIL ®M5) was added, and the composition stirred under vacuum for 60 minutes. The mixture was then cooled to 79° C. and 0.22 parts of copper bis[8-hydroxyquinolate] dissolved in 3.1 part of DEN ® 431 epoxy resin, a product of the Dow Chemical Company was added. This material was then cast as a film and coated onto glass fiber for use as a structural adhesive.

EXAMPLES 4 and 5 (COMPARATIVE)

Structural adhesives were prepared by coating commercial epoxy (Example 4) and bismaleimide (Example 5) adhesives onto a glass fiber support as in Examples 1 and 3. Electrical properties were measured over the 10–12.5 Ghz range. The results of the cured, neat resin testing are summarized below in Table I.

TABLE I

| Example[a] | Condition | Dielectric Constant | Loss Tangent |
|---|---|---|---|
| 1 | 25° C. | 2.74 | 0.005 |
| | 149° C. | 2.75 | 0.007 |
| | 232° C. | 2.76 | 0.009 |
| 3 | 25° C. | 2.8 | 0.002 |
| | 204° C. | 2.81 | 0.003 |
| 4[b] (Comparative) | 25° C. | 3.07 | 0.008 |
| 5 | 25° C. | 2.95 | 0.007 |
| (Comparative) | 204° C. | 2.96 | 0.008 |

[a]neat resin
[b]Epoxy decomposes at tempeature of c.a. 204° C. and above

EXAMPLE 6 (COMPARATIVE)

A composition was prepared and coated in accordance with Example 1 but without the epoxy functional polysiloxane. The composition contained 80 parts bis[4-cyanato-3,5-dimethylphenyl]methane, 100 parts Compimide ® 353A bismaleimide resin, and 0.2 parts copper bis[8-hydroxyquinolate] catalyst.

Adhesives from Examples 1 and 3 and Comparative Example 6 were subjected to physical testing, the results of which are summarized in Table II. As can be seen, the subject invention formulations not only posses the excellent electrical characteristics portrayed in Table I, but also are exceptional high performance structural adhesives. Table II also indicates that the adhesive from Comparative Example 6 lacks the strength exhibited by the subject invention adhesives.

TABLE II

Tensile Lap Shear Strength[d]

| Test Temperature/Condition | Adhesive from Example 1 | 3[a] | 3[b] | 6 |
|---|---|---|---|---|
| 25° C. (dry) | 2680 | 4700 | — | 1270 |
| 25° C. (wet)[c] | — | 3600 | 2540 | — |
| 191° C. (wet)[c] | — | 2800 | 3200 | — |
| 204° C. (dry) | 3670 | — | — | 1827 |
| 232° C. (dry) | — | 2000 | — | — |

[a]adherend = bismaleimide/glass fabric laminates 0.20 inch thick (.51 cm)
[b]adherend = 2024 T3 Aluminum
[c]hot/wet bond strength after 72 hour water boil
[d]ASTM D1002

EXAMPLE 7

A honeycomb core structural material was prepared by laminating two 4 layer $(0°/90°)_2$ carbon fiber (Hercules AS4) uncured face plies to a 12.5 mm thick aluminum honeycomb having a 3.2 mm cell size, by mean of two 40 mil films of the adhesive of Example 3. The assembly, under 30 psi pressure, was ramped at 1.7° C./minute to 120° X. where it was held for 1 hour, following which the temperature was raised to 177° C. for 6 hours. Thus the face plies and adhesive were cocured. The assembly was post cured for 2 hours at 227° C. and 1 hour at 250° C. The flatwise tensile strength (ASTM C297) was 980 psi at 25° C., 840 psi at 204° C., and 610 psi at 232° C.

EXAMPLE 8

Syntactic foams were prepared by mixing together at 130° C. for 2 hours 7.5 parts of bis[4-cyanato-3,5-dimethylphenyl]methane, 67.9 parts of a commercial cyanate resin based on phenolated dicyclopentadiene, and from 15 to 40 weight percent, base on total composition weight, of glass microspheres. Following cooling to 90° C., 0.105 part of copper bis[8-hydroxyquinoline] dissolved in 1.5 parts of DEN ® 431 epoxy resin was added. The foams were cured at 177° C. Electrical and physical properties of the cured foams are presented in Table III.

TABLE III

| Microsphere Wt. % | Microsphere[c] Density | Density, g/cm³ | Dielectric Constant[a] | Loss Tangent[a] | Block Compression Strength[b] Load | PSI |
|---|---|---|---|---|---|---|
| 20 | 0.34 g/cm³ | 0.74 | 2.14 | 0.004 | 2005 | 12,850 |
| 30 | 0.34 g/cm³ | 0.69 | 1.98 | 0.006 | 1860 | 11,950 |
| 40 | 0.34 g/cm³ | 0.61 | 1.87 | 0.006 | 1125 | 7,230 |
| 35 | 0.34 g/cm³ | 0.66 | 1.96 | 0.005 | 1770 | 11,430 |
| 22 | 0.2 g/cm³ | 0.54 | 1.90 | 0.005 | 1370 | 8,920 |
| 32 | 0.32 g/cm³ | 0.64 | 1.98 | 0.005 | 2650 | 17,120 |
| 15 | 0.1 g/cm³ | 0.54 | 1.78 | 0.005 | 1230 | 7,920 |

[a]All measurements at room temperature. Dielectric constant and loss tangent at 10 Ghz.
[b]ASTM D1621
[c]Glass microspheres all have average diameters of c.a. 150 μm and are composed of borosilicate glass.

EXAMPLE 9

A paste adhesive was prepared as follows. At 150° C., 23 parts by weight of ERL ® 4221 cycloaliphatic epoxy resin available from the Union Carbide Corporation, 50 parts of cyanate ester resin based on phenolated dicyclopentadiene and available from the Dow Chemical company as Dow XU71787.02 resin, and 20 parts of bis[4-cyanato-3,5-dimethylphenyl]methane was combined with 5.0 parts of MATRIMID ® 5218. The mixture was stirred for a period of rom 4-6 hours until a homogenous solution was obtained whereupon 4.0 hours until a homogenous solution was obtained whereupon 4.0 parts of silicon dioxide filler (CABOSIL ® M5) was added and stirred until fully dispersed. After cooling at 90° C. , 0.1 parts of copper bis[8-hydroyquinolate] dissolved in 3.0 parts of an epoxy novolac resin was added. The paste adhesive was stored at −18° C. until use.

EXAMPLE 10

An expandable foam adhesive was prepared by mixing, at 150° C., 70 parts by weight of bis[4-cyanato-3,5-dimethylphenyl]methane and 5.0 parts of Matrimid 5218 polyimide. The mixture was stirred for from 4–6 hours until homogenous whereupon 20 parts of a eutectic mixture of bismaleimide resins, COMPIMIDE® 353, was added. Following solution of the bismaleimide, 3.0 parts of CABOSIL M5 was dispersed into the mixture. After cooling to 90° C., 0.1 part copper bis[8-hydroxyquinolate] and 0.2 part p,p-oxybisbenzenesulfonyl hydrazide (CELOGEN® OT, a product of Uniroyal), both dissolved in 3.0 part of epoxy novolac resin, was added. The adhesive was then cast as a 50 mil thick film and sorted at −18° C. prior to use.

EXAMPLE 11

The composition of Example 3 was coated onto ASTROQUARTZ® 502 for use as prepreg. A 12.5 mm thick composite was prepared by laying up approximately 50 plies of fabric into an isotropic $[0°, 90°]_{25}$ layup and curing at 177° C. Electrical properties of the cured composite were measure at 10 Ghz and are presented below in Table III.

TABLE III

| Temp | Dielectric Constant | Loss Tangent |
|---|---|---|
| 25° C. | 3.26 | 0.002 |
| 204° C. | 3.25 | 0.004 |

EXAMPLE 12

A leading edge radome is prepared by laying up Astroquartz® fabric, impregnated with a matrix resin system whose cyanate resin content is approximately 80 weight precent, into the desired exterior and interior configurations. The interior space is filled with a syntactic foam prepared as in Example 8 and having a 20 weight percent microsphere loading and a density of 0.74 $g/cm^3$. The finished radome has considerably enhanced radar wave transmission properties over otherwise similar radomes prepared using epoxy and/or bismaleimide resins instead of cyanate resins.

EXAMPLE 13

A large shipboard type radome is prepared form honeycomb core structural material. The honeycomb material is prepared by laminating two exterior face plies and one internal ply to two extruded polyimide honeycombs each 2.54 cm thick. The face plies are prepared by impregnating Astroquartz fabric $(0,90°)_2$ with c.a. 35 weight percent of a matrix resin similar to that of Example 12. At the interfaces between the exterior face plies and the honeycomb and also between the two honeycomb layers and the internal ply are layed up the cyanate structural adhesive of Example 3. The layup is pressure bagged to 30 psi and cured as in Example 7. The resulting two layer honeycomb structure has increased transparency to radar waves as well as lower reflection and refraction then similar radomes prepared using epoxy or bismaleimide structural materials in the place of one or more of the above applications containing cyanate resins.

EXAMPLE 14

A radome protective cover of a polyethylene composite is adhesively fastened to a radome as in U.S. Pat. No. 4,436,569, but the cyanate adhesive of Example 3 is used. The over shows increased adhesion even at 232° C. while having excellent transparency to radar waves.

EXAMPLE 15

In a manner similar to that of Example 8, a syntactic foam was prepared employing 8.2 parts bis[4-cyanato-3,5-dimethylphenyl]methane, 65.9 parts of a commercial cyanate resin based on phenolated dicyclopentadiene, and catalysed with 0.2 parts copper bis[8-hydroxyquinoline] dissolved in 2.6 parts DEN® 431 epoxy resin. Microspheres having a density of 0.2 $g/cm^3$ were added at a 23.1 percent by weight level.

The embodiments of the invention in which an exclusive privilege or property is claimed are defined as follows:

1. A hear curable, matrix resin-impregnated prepreg capable of preparing a cured composite having a loss tangent at 10 Ghz of less than about 0.010 when measured by ASTM D1621 and a low dielectric constant, comprising:

A) reinforcing fibers; and

B) a heat curable matrix resin comprising i) about 70 percent or more of a cyanate resin component comprising a) from 5 to about 60 percent based on the weight of the cyanate resin component of a dicyanate or polycyanate monomer; and b) at least 40 percent based on the weight of the cyanate resin component of a cyanate resin prepolymer;

ii) from 0 to 25 percent by weight of a bismaleimide resin;

iii) from 0 to 25 percent by weight of an epoxy resin; and iv) up to about 20 weight percent of an engineering thermoplastic;

wherein component (iv) is first dissolved in component (i(a)) or (ii) following with component (i(b)) is added, such that the thermoplastic (iv) remains in solution.

2. The prepreg of claim 1 wherein the engineering thermoplastic is selected from the group consisting of the fully imidized polyimides, polyether imides, polyesterimides, polyamideimides, and polyarylene thermoplastics.

3. The prepreg of claim 1 wherein said reinforcing fibers are selected from the group consisting of borosilicate glass fibers, quartz fibers, and polyolefin fibers.

4. The prepreg of claim 1 wherein said matrix resin further contains an effective amount of a cyanate cure-promoting catalyst.

* * * * *